United States Patent [19]
Svala

[11] 3,821,637
[45] June 28, 1974

[54] AUTOMATICALLY COMPENSATED PERMEAMETER

[75] Inventor: Carl Gunnar Svala, Delaware, Ohio

[73] Assignee: North Electric Company, Galion, Ohio

[22] Filed: Apr. 23, 1973

[21] Appl. No.: 353,418

Related U.S. Application Data

[63] Continuation-in-part of Ser. No. 248,175, April 27, 1972, abandoned.

[52] U.S. Cl. .......................................... 324/34 PE
[51] Int. Cl. .......................................... G01r 33/14
[58] Field of Search ............... 324/34 R, 34 PE, 40

[56] References Cited
UNITED STATES PATENTS
1,559,085  10/1925  Gokhale ......................... 324/34 R

OTHER PUBLICATIONS

Mee, et al.; An Improved Precision Permeameter; Proc. of IEEE; vol. 1; part II; December, 1954; pp. 639–642.

Primary Examiner—Robert J. Corcoran
Attorney, Agent, or Firm—Johnson, Dienner, Emrich, Verbeck & Wagner

[57] ABSTRACT

A permeameter for testing a rod sample of a material wherein magnetizing flux and compensation coils are wound around a rod sample of the material, and magnetometers are provided for automatic detection and compensation of magnetic potential difference.

27 Claims, 15 Drawing Figures

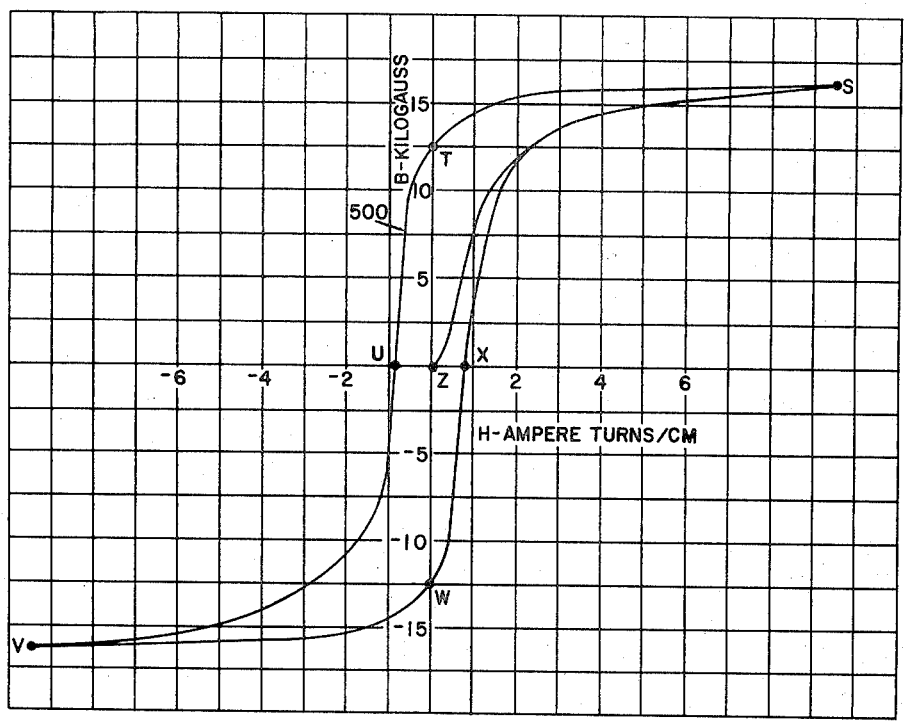
FIG. 5
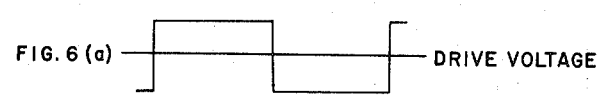
FIG. 6(a) — DRIVE VOLTAGE
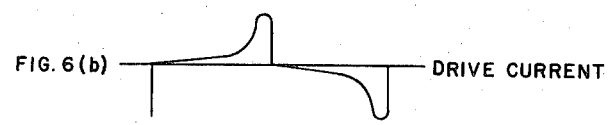
FIG. 6(b) — DRIVE CURRENT
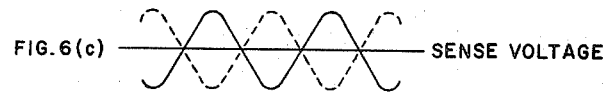
FIG. 6(c) — SENSE VOLTAGE
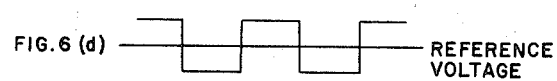
FIG. 6(d) — REFERENCE VOLTAGE
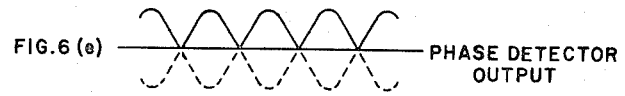
FIG. 6(e) — PHASE DETECTOR OUTPUT

AUTOMATICALLY COMPENSATED PERMEAMETER

This application is a continuation-in-part of application Ser. No. 248,175, filed Apr. 27, 1972, and now abandoned, by Carl Gunnar Svala for Automatically Compensated Permeameter, and assigned to the assignee of this invention.

BACKGROUND OF THE INVENTION

1. Field of the Invention

This invention relates to permeameters for measuring the magnetic properties of materials, and especially to those permeameters offering automatic compensation for losses in joints and end pieces.

2. Description of the Prior Art

A multitude of permeameters have been developed over the last 60 to 70 years for measuring the magnetic properties of materials, characterized by the relationship between flux density and the magnetic field strength in the materials. The Rowland ring, the Epstein apparatus, the Fahy unit, and the Burrows permeameter are a few of the many permeameters which have been proposed or used at one time or another; but these existing devices lack accuracy or are extremely tedious and cumbersome to use.

The Rowland ring is probably the most accurate permeameter in use. The material being tested is toroidal in shape and is provided with two equally distributed windings—one winding being used to energize the material that is to provide the magnetic field; the other winding to measure the flux. An integrating amplifier is used to integrate the induced voltage in the flux winding, which voltage is proportional to the flux change per unit time. Due to the symmetry of the ring sample, by knowing the number of turns in the magnetizing winding, the magnetizing current, and the diameter of the ring sample (multiplied by $\mu$), the magnetizing force can be directly calculated in ampere turns per meter using modern electrical units.

The Rowland ring method has, however, several disadvantages; namely, unless the ring can be machined out of solid homogeneous material, a joint has to be provided which is the case if the material is available only in rod form. With rod material, the rod is rolled or bent into a ring and the ends welded together and annealed. This annealing process requires large ovens and the properties for the annealed materials have to be determined. After annealing, the appropriate two windings have to be applied. The coils, once wound, cannot be used on any other sample. All of this preparation is difficult to do, time consuming, and expensive, since in practice a manual operation is the only practical arrangement. In addition, the inclusion of the weld joint in the magnetic circuit represents an unknown magnetic reluctance. The effect of the joint can be reduced by making the ring large and by exercising great care in welding the joint. Even so, the error introduced by the joint can never be ignored and may still be of considerable magnitude especially when determining properties of materials with high permeability.

Often it is desirable to measure the magnetic properties of the material after aging at elevated temperature. Again, this requires big ovens or chambers. If the magnetic properties of the material have to be determined for the same sample after a repeated annealing process, the windings have to be discarded and new windings applied. It is evident that the Rowland ring sample method is laborious and impractical to use if rapid evaluation is desired.

The Epstein arrangement consists of four identical specimens arranged in a square with magnetic joints in the corners. The conventional Epstein arrangement consists of sheets or strips of flat magnetic material which overlap each other at the corners. In the modified version, round rods inserted through permanent coils are held in place by solid corner blocks of magnetic iron. Employed for its convenience, simplicity of construction, and ease of use, the Epstein arrangements may be regarded as an approximation, of the ideal circular configuration using ring samples.

Since the accurate measurement of magnetic field strength is a most difficult measurement problem, the symmetry of the Rowland ring configuration described above, enables the direct computation of the field strength from the ampere-turns of the magnetizing winding, assuming a uniform distributed winding. The Epstein apparatus operates in the same manner. The specimens are surrounded by two concentric windings with uniform distribution along the length of the specimen. The outer winding is used to magnetize the material; the inner winding is used to measure the flux. Obviously there will be some error in the Epstein configuration due to the reluctance in the corner joints, losses in the connecting blocks, and also due to leakage flux between the ends of the specimens, bypassing the connecting blocks. The magnitude of these errors has been as great as 17 percent even with good machine fits of the rods in the corner blocks. Errors of this magnitude are unacceptable.

In order to cancel the effect of the "air flux" between the inner flux coil and the specimen, a mutual inductance is introduced in the circuits, the size of which is determined without any specimen, to provide a total mutual inductance equal to zero between the magnetizing and the flux circuits. This compensation arrangement can be used for the Epstein apparatus and also for the Fahy unit and the Burrows permeameter described below.

The Fahy unit consists of a laminated U-shaped magnet, with a magnetizing coil on the connecting leg, and the specimen clamped to the pole legs to complete the magnetic circuit. The specimen is preferably a strip 10 inches long and is surrounded by a coil which is used to measure the flux. The field strength is measured by a coil parallel to this specimen which is mounted between the two magnetic blocks which are used to clamp the specimen to the main magnetic circuit. In this way, the reluctance between the ends of the specimen and these blocks will be very small, and as these blocks only carry leakage flux, the magnetic potential between the two blocks is a good approximation of the magnetic potential drop along the specimen. Still the effect of the joint and of the leakage flux cannot be neglected and substantial errors may be introduced. More complicated Fahy units have compensation coils to reduce the leakage flux.

The Burrows permeameter provides the accuracy of the Rowland ring with the simple construction of the Epstein apparatus. Devised by Dr. Charles Burrows in 1909, it was early adopted by the National Bureau of Standards. The original Burrows permeameter is well described in literature, for example, Thomas Spooner's, "Properties and Testing of Magnetic Materials," 1927, McGraw-Hill, New York, Pages 242–257.

The method was developed especially for the measurement of straight and rather short rods, and like the Fahy unit, uses a number of extra windings for compensation and indication. Two sample rods are secured in, and magnetically connected with end blocks, to form a closed magnetic circuit. It is desirable that the two sample rods be as equal as possible in order to obtain accurate measurements. The end blocks are clamped around the rods by screws in order to form good joints between the blocks and the rods. The end blocks are preferably made of a high permeability and low remanence material. A magnetizing coil and flux coil are wound uniformly along the length of each of the sample rods, the flux coil being wound beneath the magnetizing coil. Compensating coils are wound at the ends of the sample rods over the magnetizing coil, adjacent the end blocks. The compensating coils provide a magnetizing force to compensate for the losses in the joints and blocks at the ends of the sample rods.

The magnetizing force is obtained by feeding the magnetizing coils from a source, for instance a battery, in series with a variable resistor, an ammeter, and a polarity reversal switch. The magnetizing windings are wound with a high degree of uniformity in order to provide a homogeneous magnetic field. When the Burrows permeameter is properly operated which includes critical adjustment of the current through the compensation coils, as described below, the strength of the magnetic field in the sample rod can be directly determined knowing the current, as indicated by the ammeter, and the number of turns per meter in the magnetizing coils.

Each of the flux coils wound next to the sample rods beneath the magnetizing coil may preferably be divided into four separate coils of equal turns positioned next to each other, the windings evenly distributed along the rod. In operation all of these coils are connected in series to a ballistic galvanometer. By using a reversing switch, the coils on each end of the sample rods can be made to oppose the two center coils during the compensation procedure.

An important feature of Burrows permeameter is the provision of compensating coils which are connected in series so that they aid each other. The current through the compensating coils is provided by a battery, and regulated by a variable resistor. The polarity of the current can be reversed by a switch.

For each individual value of magnetizing current, current in the compensating coils is adjusted with the flux coils in the opposing connection, until no galvanometer deflection occurs when the magnetizing coils and compensating coils are reversed simultaneously. No deflection indicates a constant and equal flux through all of the flux coils. This means that all the flux is going through the sample rods and the end blocks, inferring proper compensation to offset the losses in the end blocks and in the joints between the samples and the end blocks.

After compensating the permeameter, the galvanometer is connected to the center coils on each sample rod and a reading is taken to obtain a point on the magnetization curve or hysteresis loop.

The process is laborious and time consuming because the compensating current is different for each value of magnetizing current. Proper current values for the compensating coils must be obtained by trial and error for each point on the hysteresis loop. Extreme care must be taken to avoid overcompensation as well as under-compensation, the source of large errors. Burrows permeameter is therefore not practical for most purposes in industry.

As pointed out above, for the Burrows permeameter, the older measuring method connected a ballistic galvanometer to the flux coil and reversed the dc magnetizing current in the magnetizing coil. The ballistic galvanometer integrated the voltage induced in the flux coil over time to given an indication proportional to flux. Point-by-point measurements were made with different values of magnetizing current.

The modern measuring method, used with the Rowland ring and the Fahy unit, is to employ an operational amplifier to integrate the output of the flux coil. Magnetizing current is cycled slowly and continuously between maximum positive and negative values, with the output of the integrating amplifier giving a continuous indication of flux. The magnetizing current measured across a shunt is fed to the X-axis of an X-Y recorder, and the integrating amplifier drives the Y-axis to plot a hysteresis loop.

SUMMARY OF THE INVENTION

The invention describes an improved Burrow's permeameter wherein the compensation current is automatically adjusted using magnetometers (flux gates) or other sensors. The sensors are arranged to measure the leakage flux resulting from the magnetic field associated with the magnetic potential difference which will exist when the current in the compensation coils is not adjusted to the optimum value. The output from each flux sensor provides a DC signal which by its magnitude and polarity indicates the intensity and phase of the leakage flux between the samples. Each of these signals is fed to a DC amplifier which controls the compensation current to the compensation coils and will attempt to bring the magnetic potential differential to zero. This is a continuous operation and will keep the potential difference at or near zero during the complete hysteresis loop.

It is recognized that the invention also can be implemented with other types of flux sensors, for instance so-called Hall generators.

The object of the invention is to provide an improved arrangement for measuring and recording magnetic properties of ferro-magnetic materials.

BRIEF DESCRIPTION OF THE DRAWINGS

FIG. 5 shows a typical hysteresis loop drawn with equipment shown in FIGS. 3 and 4;

FIGS. 6(a), 6(b), 6(c), 6(d), and 6(e) show the waveforms generated by the various components of the permeameter and hysteresis graph control panel shown in FIG. 3;

DESCRIPTION OF THE PREFERRED EMBODIMENT

Figure 1:
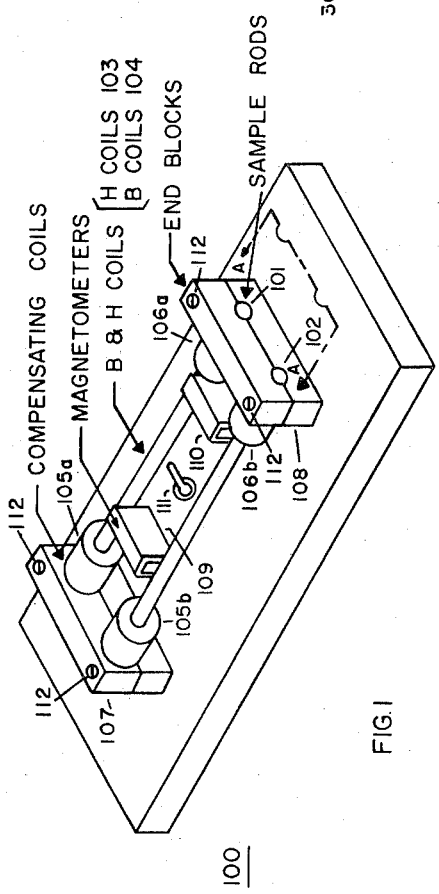
FIG. 1 is an isometric view of the permeameter of the invention.

FIG. 1 shows an isometric view of the permeameter 100 of the present invention wherein sample rods 101, 102, surrounded by magnetizing or H coils 103, flux or B coils 104, and compensating coils 105a, 105b, and 106a, 106b are secured in end blocks 107 and 108 by screws 112. A pair of magnetic sensors or magnetometers 109, 110 is interposed between the sample rods at points near the compensating coils. A switching mechanism 111 is provided to check the accuracy of the permeameter.

Figure 2:
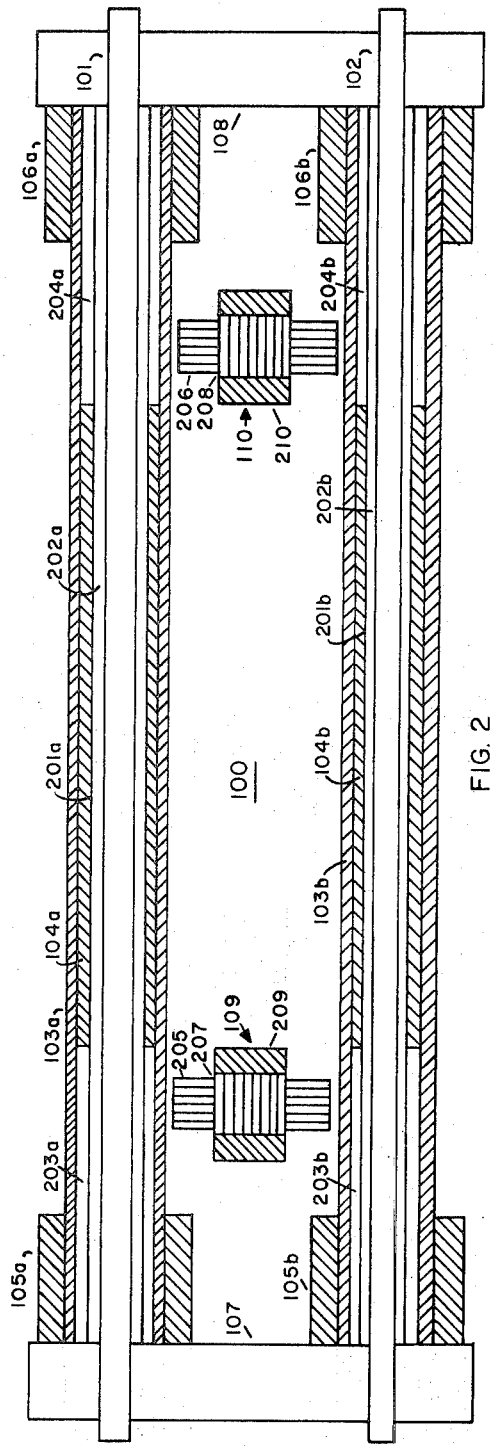
FIG. 2 is a cross sectional view of the permeameter shown in FIG. 1 taken along line A—A.

FIG. 2 is a cutaway view showing more clearly the way in which the various coils or windings 103, 104, 105a, 105b, 106a, 106b are applied around sample rods 101, 102.

Surrounding each sample rod 101, 102 is a nonconductive support tube 201a, 201b around which the flux coils 104a, 104b, the magnetization coils 103a, 103b, and the compensating coils 105a, 105b, and 106a, 106b are wound.

To permit ease in inserting different sample rods, such as 101, 102, the inner diameter of the tubes 201a, 201b are made slightly larger than the outer diameter of the sample rods thus leaving an access space 202a, 202b around each sample rod. The spacial relationship of the access space 202a, 202b is maintained by nonconductive clamps (not shown) surrounding the compensating coils, thus holding the tubes 201a, 201b and all the coils fast.

The magnetizing coils 103a, 103b are wound around the flux coils 104a, 104b and nonconductive fillers 203a, 203b, and 204a, 204b. The compensation coils 105a, 105b, and 106a, 106b are wound around the magnetizing coils 103a, 103b adjacent to the end blocks 107 and 108.

Although the nonconductive fillers 203a, 203b and 204a, 204b may not actually be needed, the H coils 103a, 103b being wound directly onto the tubes 201a, 201b adjacent the end blocks 107 and 108, the B coils 104a, 104b should not be wound beyond the magnetometers 109, 110, since uniformity of flux, which the B coils measure, can only be assured between the magnetometers.

The magnetometers 109, 110 each consists of a core 205, 206 respectively, a drive winding 207, 208 respectively, and a sense winding 209, 210 respectively. As indicated, the drive windings 207, 208 are wound under the sense windings 209, 210.

Figure 3:
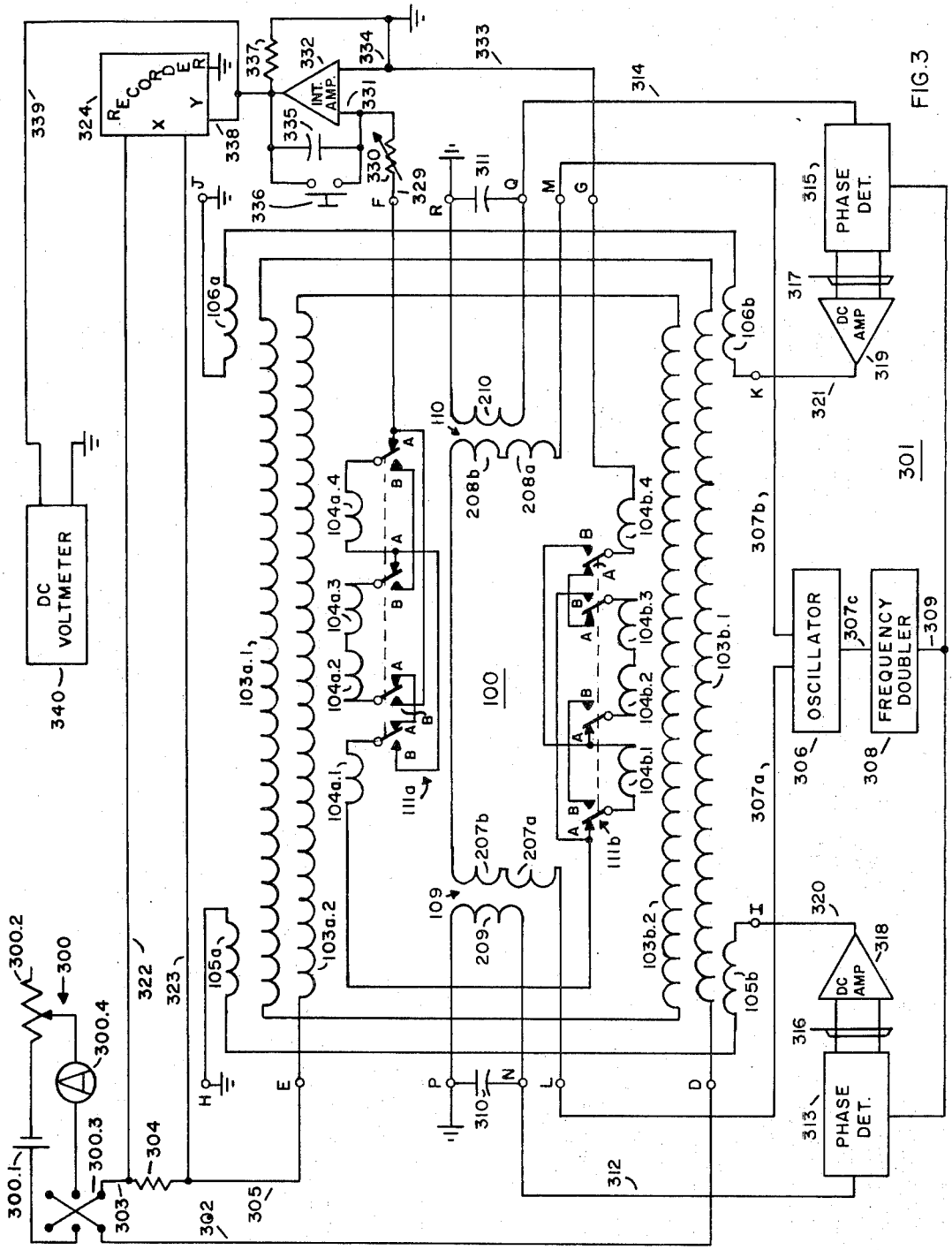
FIG. 3 is a wiring diagram of the permeameter shown in FIG. 1, the magnetizing control circuit for operating the permeameter, the automatic compensation control circuit, and the output and recording components.

FIG. 3 shows the preferred embodiment for connecting the various coils and associated equipment. As shown in FIG. 3, each H coil 103a and 103b actually consists of two layers 103a.1, 103a.2 and 103b.1, 103b.2 one wound over the other. By providing two magnetizing coils for each sample rod, the current required to produce the desired magnetizing force can be half the value which is needed if only one winding is used. All four windings, 103b.1, 103a.1, 103b.2 and 103a.2 are connected in series across terminals D and E.

Each of the flux or B coils 104a, 104b, actually consists of four individual windings 104a.1, 104a.2, 104a.3 and 104a.4; and 104b.1, 104b.2, 104b.3, and 104b.4, each winding having the same number of turns on the others. During normal operation all eight flux coils are connected in series across terminals F and G. As will be pointed out below, the flux through the center coils 104a.2, 104a.3 and 104b.2, 104b.3 is close to the ideal condition. However, the inclusion of end coils 104a.1, 104a.4, and 104b.1, 104b.4 in the series introduces errors that are imperceptable when compared to other errors in the system, and by using all eight B coils a more usable signal is generated across terminals F and G.

The compensation coils on either end of the sample rods adjacent to the end blocks are also connected in series. FIG. 3 shows compensation coils 105a and 105b connected in series across terminals H and I, and compensation coils 106a and 106b connected in series across terminals J and K.

The windings of each of the magnetometers 109, 110, as shown in FIG. 3 consist of two drive windings 207a, 207b, and 208a, 208b for each magnetometer respectively. All four windings are connected in series across terminals L and M. Sense winding 209 of magnetometer 109 is connected across terminals N and P; and sense winding 210 of magnetometer 110 is connected across terminals Q and R.

In addition to showing the windings of the permeameter 100, FIG. 3 also shows the magnetizing control circuit 300, which is used to control the current to the magnetizing or H coils; the automatic control circuit 301, used to automatically detect the output from the two magnetometers and supply the correct current to the compensating coils so as to compensate for the flux losses in the permeameter; and the various components used to integrate the output from the flux or B coils to provide a measure of the flux, and in addition to supply B and H information to a digital voltmeter and to an X-Y recorder which traces on paper the hysteresis loop of the sample rods.

To supply a magnetizing current to the H coils 103 at terminals D and E, a current source, such as a battery, 300.1 is provided as part of the magnetizing control circuit 300. A potentiometer 300.2 varies the output of battery 300.1, the polarity of the current at terminals D and E being controlled by reversing switch 300.3. Both output and polarity are indicated by ammeter 300.4.

Line 302 connects the magnetizing control circuit 300 to terminal D and one side of the H coils 103. Limit 303 connects the magnetizing control circuit 300 over a shunt resistance 304 which is in turn connected by lead 305 to terminal E and the other side of the H coils 103.

To furnish current to the drive windings 207, 208 of both magnetometers 109, 110, an oscillator 306 is provided as part of the automatic control circuit 301. Oscillator 306 is connected over lead 307a to terminal L, over lead 307b to terminal M, and over lead 307c to the input of a frequency doubler 308 which in turn outputs a reference voltage on lead 309.

The electrical output of each magnetometer 109, 110, actuates a phase detector and amplifier circuit (313, 318 and 315, 319) whose output feeds current to the compensating coils 105, 106. In order to obtain maximum accuracy, each magnetometer 109, 110 is provided with its own detector and amplifier circuit feeding its associated compensating coils. Accordingly, separate compensation is obtained for both ends of the samples. This arrangement will take care of any difference in reluctance at the ends of the samples due either to the magnetic joints or the end blocks themselves.

Across each of the magnetometer sense windings 209, 210, a shunt capacitor 310, 311 is placed to change the peak waveform to a sinusoidal waveform. Shunt capacitor 310 is connected between terminals N and P, terminal P being tied to ground; shunt capacitor 311 is connected between terminals Q and R, terminal R being tied to ground. The shunt capacitors are selected to give maximum voltage output. (The sense winding and its associated capacitor form a tuned circuit resonant at twice the oscillator frequency).

Lead 312 connected to terminal N feeds the voltage on sense windings 209 to phase detector 313, while lead 314 connected to terminal Q feeds the voltage on winding 210 to phase detector 315. The reference voltage on lead 309 and the flux gate sense voltages on leads 312 and 314 enter each of the phase detectors 313 and 315 respectively. Phase shifting means are inserted as part of the frequency doubler 308 in the path from the oscillator 306 to the phase detectors in order to shift the phase of the reference signal to that emanating from the sense winding.

The output signal from each of the phase detectors 313 and 315, on leads 316 and 317 respectively, is a DC voltage (which, properly filtered, is indicative of the leakage flux) of polarity determined by the phase of the sense voltage with respect to the reference voltage on lead 309, and of magnitude proportional to the sense voltage. The outputs on leads 316 and 317 are amplified by DC amplifiers 318 and 319 respectively. The amplified output on leads 320 and 321 drives the compensating coils 105, 106 respectively, to attempt to null the fields detected by the flux gate magnetometers 109, 110 in order to make the leakage flux between the samples equal to or almost equal to zero.

The magnetizing current in the H coils can thus be varied continuously, and the feedback loop involving magnetometers and compensating coils will continuously adjust the compensating currents to proper values.

Connected on either side of shunt resistance 304 are leads 322, 323 which convey a voltage proportional to the magnetizing current to the X terminal of X-Y recorder 324.

The current induced in flux coils 104a and 104b appear at terminals F and G. Terminal F is connected by lead 329 to one side of variable resistor 330, the other side of the resistor being connected to input terminal 331 of integrating amplifier 332. Terminal G is connected by lead 333 to input terminal 334 of integrating amplifier 332, input terminal 334 being connected to ground.

Connected across the output of integrating amplifier 332 and input terminal 331 are capacitor 335 and reset button 336. Capacitor 335, along with variable resistor 330 determines the integrating time constant of integrating amplifier 332. The reset button 336 is a momentary action button and the contacts are not held in place after the button is released. When operated, the reset button shorts out capacitor 335, and sets the integrating amplifier 332 to zero.

Fixed resistor 337, connected between the output of integrating amplifier 332 and ground at input terminal 334, acts as a constant load for the amplifier to prevent damage to the amplifier (i.e., if there should be no connection to the output of the amplifier).

The output of amplifier 332 is transmitted over lead 338 to one of the terminals of the Y input to recorder 324; the other terminal of the Y input being connected to ground. The output of amplifier 332 is also conveyed over leads 339 to one of the terminals of DC voltmeter 340, the other terminal of the voltmeter being connected to ground.

Figure 4:
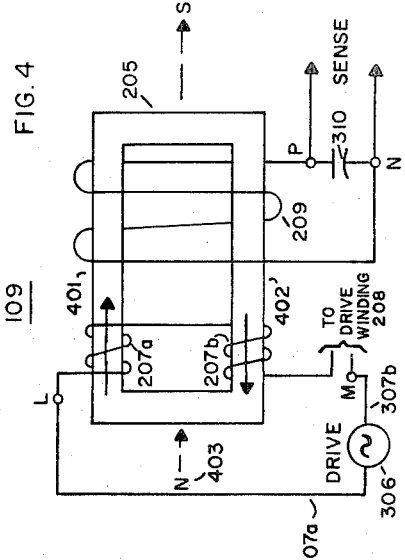
FIG. 4 is an illustrative representation of the magnetometers shown in FIG. 1.

Details of the structure and operation of the magnetometer 109 are shown in FIG. 4. Magnetometer 110 is similar to magnetometer 109 so that the following description refers to both. The saturable magnetic core 205 of high permeability nickel-iron laminations has wound on each of its two legs 401, 402, a single drive winding 207a, 207b respectively. A sense winding 209 is wound around the entire structure of magnetometer 109, being wound over drive windings 207a, 207b. The drive windings of both magnetometers 109 and 110 are energized by the oscillator 306; lead 307a of the oscillator being connected to terminal L and the drive windings 207 of magnetometer 109; lead 307b of the oscillator being connected to terminal M and the drive windings 208 of magnetometer 110. Shunt capacitor 310 is connected across the output of the sense winding 209, across terminals N and P.

For illustration purposes assume that the flux gate is placed in an external magnetic field 403, illustrated by "N" and "S" and the dotted arrows. The external magnetic field is actually provided by magnetizing winding or H coils 103 around each of the sample rods 101 and 102. This external magnetic field causes a flux to pass through the structure 109 from end to end. When current is fed to the drive windings 207a, 207b to saturate the core (solid arrows), the flux through the structure resulting from the external field 403 is reduced. By energizing the drive windings with alternating current sufficient to saturate the core during a portion of each half cycle, the flux created by external field 403 is modulated or "gated" on and off, inducing an AC voltage in the sense winding 209.

Because the drive current saturates the core on each half cycle, the fundamental frequency of the sense voltage is twice the drive frequency. Relative polarity of the sense voltage is determined by polarity of the external field 403; if the external field 403 is reversed, the phase of the sense voltage with respect to the drive current changes 180°. If the external field is zero, no voltage is induced in the sense winding 209, assuming the structure is perfectly symmetrical.

The graph 500 of FIG. 5 illustrates a typical hysteresis loop, for virgin sample rods 101 and 102, as plotted by the automatically compensated permeameter 100, using the X-Y recorder 324 and the magnetizing control circuit 300. With the potentiometer 300.2 set at its highest resistance setting the value of the magnetizing current H and the resulting flux B should be zero, point Z on graph 500. With the switch 300.3 set to give positive output as the center tap of the potentiometer 300.2 is adjusted so as to reduce the resistance, the magnetizing current H increases and the flux B rises until a set specified value is reached at point S. As the potentiometer center tap is adjusted so that the resistance increases the magnetizing current H is reduced to zero and the flux B falls to a point T on the vertical axis. The value of point T can be read on DC voltmeter 340. The switch 300.3 is reversed and this time as the magnetizing current H is increased negatively, the flux B continues to fall to zero at point U. Futher negative magnetizing current drives the flux toward a set negative value indicated at point V. Decreasing the negative current to zero would cause the flux to rise to point W. With switch 300.3 again reversed, an increased positive current will cause the flux to rise through point X to point S again.

Magnetizing current and X-Y recorder controls can be set to expand any region of the curve to obtain accurate readings of such valves as coercive force, Z-U or Z-X; remanence, Z-T or Z-W; and maximum permeability, B/H.

FIG. 6 illustrates waveforms in various parts of the system. Oscillator output on leads 307a, 307b, and 307c is the square wave voltage of FIG. 6(a). Near the each of each half cycle, the flux gate core saturates and current rises from a low to a high value, giving the drive current waveform, through drive coils 207 and 208, of FIG. 6(b).

Each time the core saturates, flux from the external field is reduced, generating a voltage pulse in the sense winding 209 and 210. The winding is broadly turned to double the oscillator frequency by shunt capacitor 310, 311 so its actual output on lead 312, 314 is roughly sinusoidal, as shown by the solid line of FIG. 6(c). If the external field were of opposite polarity, sense voltage polarity would be reversed, as shown by the dotted line.

The frequency doubler 308 gives a square wave reference voltage of FIG. 6(d), on lead 309. Circuit constants are chosen so that the reference voltage is in phase with the expected flux gate sense voltages.

The phase detectors 313 and 315 are synchronous rectifiers such that the sensed voltage on lines 312 and 314 is transmitted through phase detectors 313 and 315 without inversion when the reference voltage is negative, but is inverted when the reference voltage is positive. Consequently, phase detector output on leads 316 and 317 is a full wave rectified replica of the sense voltage, with the polarities shown by the solid and dotted lines of FIG. 6(c) corresponding to the solid or dotted sense voltage polarities of FIG. 6(c).

Phase detector output on lead 316 and 317 is filtered to remove ripple, and amplified by a DC amplifier 318 and 319 to furnish current of either polarity to the compensating coils 105 and 106.

To given an idea of magnitudes, using 625 Hz oscillator 306, flux gate drive voltage, FIG. 6(a), is 10 volts (for the two gates in series), and peak current, FIG. 6(b), during the saturated interval is 200 ma. With that drive, sense finding output, FIG. 6(c), is about 0.2 volts RMS for an external field equal to the earth's magnetic field. The phase detector DC amplifier combination will deliver full output, FIG. 6(e), with less than 0.01 volt input, corresponding to about 5 percent of the earth's magnetic field.

The 625 Hz drive frequency was chosen as a convenient compromise between sensitivity and power. Higher frequency produces greater sense voltage, but also requires more driving power. Higher frequency, of course, would permit faster response to sudden field changes in systems where speed was important.

Response speed of the present system is about 10 to 20 milliseconds with no overshoot or instability in the feedback loop. As that speed is more than ample for the intended application, no attempt was made to optimize the feedback network for maximum speed without hunting.

The accuracy of the permeameter with its automatic compensation can be checked by using the segmented B coils as shown in FIG. 3. This is accomplished by changing the hookup of the various coils so that the end coils 104a.1, 104a.4, and 104b.1, 104b.4, are in opposition to the center coils 104a.2, 104a.3, and 104b.2, 104b.3 to detect flux nonuniformity. The toggle switch 111 shown in FIG. 1, activates multiple switches 111a and 111b shown in FIG. 3. Switches 111a and 111b change the hookup of the flux coils 104a, 104b from an adding configuration, when the coils are connected to the A terminals, to a bucking or opposition configuration, when the coils are connected to the B terminals. In this mode of operation, the hysteresis graph plots the difference in flux through the center coils and the end coils, optimally a flat curve, thus providing an indication of the uniformity of the magnetic field through the samples. This difference compared to the total flux as determined in the normal mode, can be used as a measure of the error in the measurement due to imperfect compensation. It is safe to assume that the basic accuracy attainable, in the determination of B and H, is of the same order or better than the ratio of the difference flux to the average flux, disregarding other sources of error, not related to the magnetic structure. When the complete assembly of the magnetizing control panel 300, the automatic control circuit 301, and the permeameter 100 is placed on a wooden table completely free of any magnetic or metal objects, the proper environment for actual use, the accuracy described accordingly is found to be well within the range of acceptable error. For high precision measurements it is desirable that the earth's magnetic field should be neutralized or compensated for by external coil arrangements as is well known in the art.

The relatively high degree of accuracy obtainable with the improved permeameter is achieved due to the technique by which the stray flux is compensated for. FIG. 7 illustrates this technique.

Figures 7A, 7B:
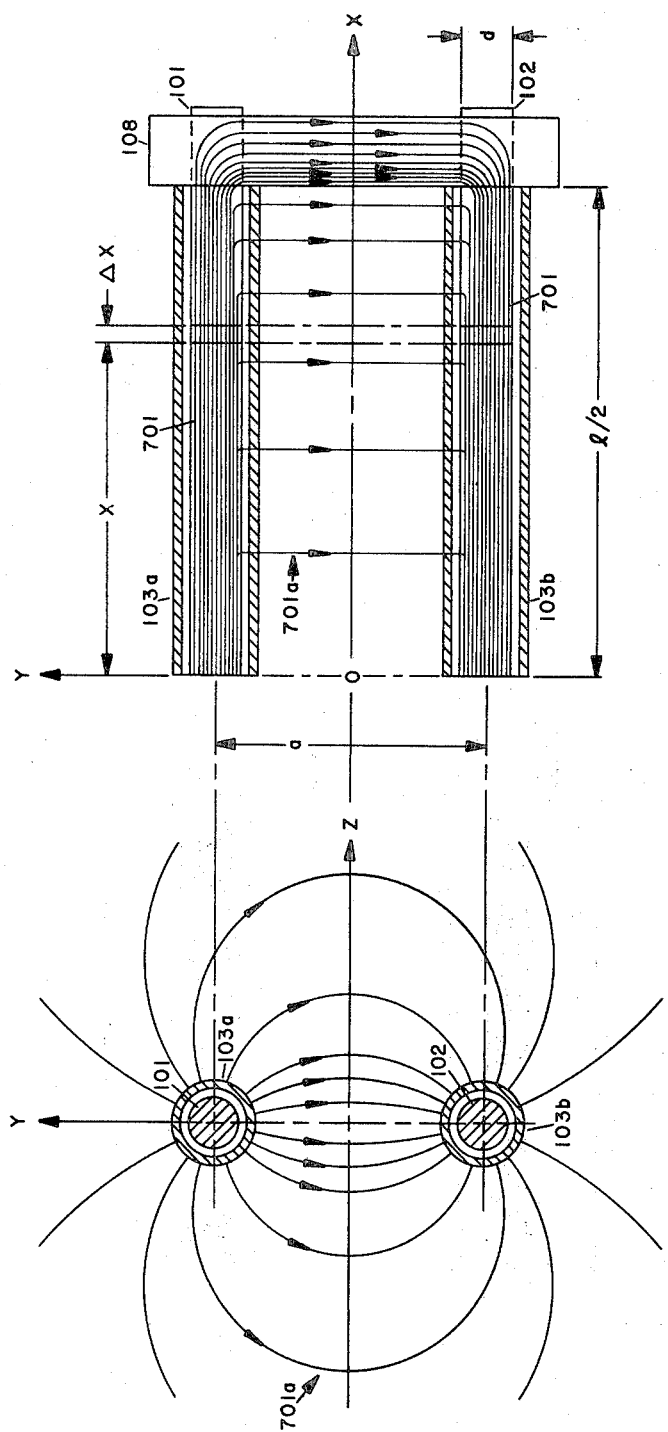
FIGS. 7(a) and 7(b) illustrate a theory of operation.

FIG. 7A shows the right half of a Burrows permeameter. For simplicity only, the sample rods 101, 102, the magnetizing coils 103a and 103b and the end block 108 are shown. The magnetic lines of force 701 created by the magnetizing coils are also illustrated in the figure. FIG. 7B is a cross section of FIG. 7A.

To facilitate the analysis, complete symmetry is assumed with respect to three planes defined by $x = 0$, $y = 0$ and $z = 0$. This assumption is valid provided the material is homogenous and the four joints between the specimen rods 101 and 102 and the end blocks 107 (not shown) and 108 exhibit equal magnetic reluctance. If proper care is exercised in manufacture and assembly of the fixture, these provisions can be met. It can also be assumed that the leakage flux 701a will be perpendicular to the X-axis, as indicated in the drawing. In reality this will not be true for the leakage field close to the end blocks because of the nonlinear properties of the sample materials and the end blocks. However for analysis purposes it is a reasonable assumption.

It is recognized that the problem of the field and flux distribution can be analyzed in a similar way as for a leaky, balanced transmission line where the leakage flux $\phi\delta$ corresponds to the leakage current. A peculiar feature is the introduction of the distributed MMF as generated by the magnetizing coils.

We define the following constants:
Magnetizing ampere turns/unit length $= m$
Reluctance of the rods/unit length $= r$
Magnetic leakage conductance/unit length $= s$
(Conductance equals the inverse of reluctance) $r$ and $s$ are defined by the structure as follows:

$$r = 2/A \cdot \mu_r \cdot \mu_o$$

$$s = \frac{\pi \mu_o}{\ln \frac{a + \sqrt{a^2 - d^2}}{d}}$$

where:
$A$ is the cross-sectional area of the rod; $A = (\pi/4) d^2$ $d$ is the diameter of the rod; and
$a$ is the distance between the center of the rods;
$\mu_r$ is the relative permeability with reference to vacuum;
$\mu_o$ is the permeability for vacuum.

The factor 2 accounts for the inclusion of the reluctance of both rods in the definition of $r$.

We further define the following variables:
Main flux in the rods $\phi = f(x)$
Leakage flux between the rods/unit length $= \phi$ $g(x)$
Magnetic potential difference between the rods $= M$ $= h(x)$ Consider a vertical "slice" of thickness $\Delta x$. *The leakage flux in this slice* $\Delta 0\delta = M \cdot s \cdot \Delta x$ represents also the loss of main flux $- \Delta \phi$ $$\therefore -\Delta \phi = sM \cdot \Delta x;$$

$$\therefore \lim_{\Delta x \to 0} \frac{\Delta \phi}{\Delta x} = \frac{d\phi}{dx} = -sM \quad (1)$$

The magnetic potential receives an increment $m \cdot \Delta x$ but also a loss $r\phi \cdot \Delta x$ $$\therefore (M)_{x+\Delta x} = (M)_x + (m - r\phi) \Delta x$$

$$\therefore \lim_{\Delta x \to 0} \frac{\Delta M}{\Delta x} = \frac{dM}{dx} = m - r\phi \quad (2)$$

The field and flux distribution is now defined by the equation system:

$$d\phi/dx = -s \cdot M \quad (1)$$

$$dM/dx = m - r\phi \quad (2)$$

Differentiating equation (2) and combining with equation (1)

$$\frac{d^2M}{dx^2} - rsM = 0$$

$$\therefore M = C_1 e^{\sqrt{rs}\, x} + C_2 e^{-\sqrt{rs}\, x} \quad (3)$$

where $C_1$ and $C_2$ are integration constants.

From the symmetry it is evident that $M = 0$ for $x = 0$. Defining, $$C_1 = -C_2 = km/2\sqrt{rs}$$

Where $k$ is a new constant $$\therefore M = km/\sqrt{rs}\, \text{Sinh}\, \sqrt{rs}\, x \quad (4)$$

Differentiating and substituting equation (4) in equation (2);

$$\phi = 1/r\, (m - km \cosh \sqrt{rs}\, x) \text{ or,}$$

$$\phi = m/r\, (1 - k \cosh \sqrt{rs}\, x) \quad (5)$$

The constant $k$ can be determined by the conditions at the end blocks. Assuming the total reluctance of each end block and associated joints to be $R_b$, $$\therefore M = R_b \phi \quad (6)$$

Inserting into equation (6) the values for $M$ and $\phi$ from equations (4) and (5) and substituting for $x$ the value $l/2$ where $l =$ the total length of the sample rod between the end blocks, $$km/rs \sinh \sqrt{rs}\, l/2 = R_b(m/r)\, (1 - k \cosh \sqrt{rs}\, l/2)$$
$$\therefore k = R_b/\sqrt{r/s} \sinh \sqrt{rs}\, l/2 + R_b \cosh \sqrt{rs}\, l/2 \quad (7)$$

It may be observed that the $\sqrt{r/s}$ corresponds to a characteristic "impedance" of the magnetic transmission line and may be defined as $$Z = \sqrt{r/s}$$

Equation (5) can now be rewritten as
$\phi = m/r\, (1 - R_b \cosh \sqrt{rs}\, x/Z \sinh \sqrt{rs}\, l/2 + R_b \cosh \sqrt{rs}\, l/2)($ $(5a)$ This equation confirms the obvious fact that making $R_b = 0$ will render $\phi =$ constant $= m/r$, that is the ideal condition which also applied to the homogeneous Rowland ring configuration. $R_b = 0$ corresponds to a case where the end blocks have infinite conductivity (including the joints) and they could then also be considered equivalent to "ground-planes" located at $x = \pm l/2$.

The effect of the compensation coils in the Burrows's permeameter is to introduce additional MMF in series with the joints and the end blocks to compensate for the magnetic potential drops caused by the main flux, that is, to reach the same ideal condition outlined above. In this way, with proper compensation, one might claim that at the location of the magnetometers an artificial "ground plane" is introduced which intersects the rods. The term "ground plane" normally used to indicate a plane where the electrostatic potential is constant, is used herein to indicate a plane where the magnetic potential is constant. In the arrangement according to the invention in the modified Burrow's permeamater, this artificial ground plane is controlled by the magnetometers in that they measure the magnetic potential difference between the rods. With the amplifier arrangement feeding the compensation coils, a feedback control system is defined which attempts to minimize the magnetic potential difference monitored by the magnetometers. With sufficient gain in the control system and the net result is that the magnetic potential difference M at the location of the magnetometers approaches zero and in effect the ideal situation of an artificial ground plane at that location is obtained.

In order to maintain stability the gain in the control system must be limited. Accordingly a small residual potential difference $M_r$ will exist at the magnetometers. It follows that according to equation (5) the flux through the rods will decrease somewhat from the center, thus introducing an error in the flux measurement. The magnitude of this error may be determined by measuring the difference in flux as intercepted by the center and the outer B coils. As shown in FIG. 3, the center coils are 104a.2, 104a.3, and 104b.2, 104b.3, the outer coils are 104a.1, 104a.4, and 104b.1, 104b.4.

Assuming a flux distribution according to equation (5) and a length of each coil of $l'/4$, where $l'$ is a total length of the B coils surrounding each rod, the measured flux through the center coils $\phi_c$ is obtained by integration of equation (5)

$$\phi_0 = \frac{4}{l'} \int_0^{l'/4} \frac{m}{r} (1 - k \cosh \sqrt{rs}\, x) dx$$

$$\therefore \phi_0 = \frac{m}{r} \left[ 1 - k \frac{\sinh \sqrt{rs}\, l'/4}{\sqrt{rs}\, l'/4} \right] \quad (8)$$

Introducing the argument $u = \sqrt{rs}\, l'/4$ $\therefore \phi_c = m/r$ $[1 - k \sinh u/u]$ (8a)

Correspondingly the average flux measured by series connection of center and end coils is easily obtained as $\phi_c + \phi_e / 2 = m/r\, [1 - k \sinh 2u/2u]$ (9)

where $\phi_e$ is the measure flux through the end coils.

By subtraction of (9) from (8a) we obtain an expression for the flux measured in the "bucking mode"; $\phi_c - \phi_e/2 = k\, (m/r)\, [\sinh 2u/2u - \sinh u/u]$ (10)

Recognizing that $m/r$ represents the desired flux $\phi_o$ obtained with perfect compensation and eliminating $k$ between equations (9) and (10) we obtain $$\phi_o = \phi_c + \phi_e/2 + \phi_c - \phi_e/2 \cdot \cosh u / \cosh u - 1$$
(11)

A further simplification is possible if we replace cosh u with a series expansion, neglecting higher terms:

$$\phi_o = \phi_c + \phi_e/2 + (1 + 2/u^2)\, \phi_c - \phi_e/2$$
(12)

It is evident that the second term above represents the error due to imperfect compensation. A numerical example will illustrate the importance of this yerm.

According to the definitions $u^2$ can be computed as $$u^2 = \frac{(l'/d)^2}{2u_r \ln \frac{a + \sqrt{a^2 - d^2}}{d}}$$

Insertion of values from a typical case:
$l' = 6.4''$ $d = 0.32''$ $a = 2.25''$ and $\mu r = 4,000$ renders $u^2 = 0.019$ Accordingly the multiplier in the error term becomes greater than 100. This clearly illustrates that Burrow's original method not only is tedious but requires extreme care in the compensation, using the bucking mode, if big errors shall be avoided. Obviously with manual adjustment over-compensation can just as easily occur as under-compensation. Further a slight dimensional error in the B-coils will lead to serious systematic compensation errors. With a compensation to 0.1 percent of the normal reading an error of more than 10 percent in the final measurement will be introduced.

The new modified Burrow's permeameter circumvents this basic problem in that the compensation no longer depends on extremely accurate balancing of two quantities but on direct sensing of a magnetic potential difference using flux gate type magnetometers which are characterized by very high sensitivity to magnetic fields. The action is enhanced by letting the cores of the magnetometers form magnetic shunts between the coils surrounding the specimens. The "DC-flux" through the cores will then be directly proportional to the magnetic potential difference M between the rods and, except for the unavoidable airgaps to accommodate the H- and B- coils, inversely proportional to the reluctance of the magnetometer cores which is very low in the unsaturated condition. In the actual case it may be possible with proper design to limit the overall error due to residual magnetic potential difference to the order of 1 percent or better.

One of the advantages of the present illustrated embodiment results from the closeness of the magnetometers to the sample materials. The magnetometers 109 and 110 tend to concentrate the residual magnetic flux lines through their cores, which concentration enhances the operation of the device by providing greater sensitivity. This concentration of flux lines would not occur if, for example, a semiconductor sensor were used. Such a sensor would have no effect on the pattern of the flux lines.

The Burrows permeameter with automatic compensation is accurate and convenient for both production and laboratory testing. Simple straight rod samples can be inserted and a plotted hysteresis loop obtained in a few minutes. The instrument has become a standard method for measuring the properties of soft magnetic iron used in telephone type relays.

The use of the concept of an artificial ground plane and the use of the magnetometer cores to form magnetic shunts between the coils surrounding the specimen, both described above, can be used to effect a simplification of the aforedescribed automatically compensated permeameter.

Assume, for example, that the losses in the joints between the sample rods and the end blocks are of the same magnitude. Then, instead of measuring and trying to reduce to zero the magnetic potential which exists between the ends of two sample rods, the magnetometers should measure and attempt to reduce to zero the magnetic potential which exists between the two ends of a single sample rod; or at least reduce to zero the magnetic potential across that portion of the rod and surrounding coils where the flux density and the magnetic field strength is to be determined.

In addition, assume that the magnetic structure depicted in FIGS. 7a and 7b be cut into two parts by a plane perpendicular to the figures along the X-axis. Assume also that half of the structure is replaced by a magnetic ground plane of infinite magnetic conductivity making good magnetic contact with the remaining halves of the end blocks. Since the field configuration of the structure would not be altered by the above changes, these theoretical changes can be implemented by the structure shown in FIG. 8a.

In this alternate embodiment a single sample rod 801 is secured in a yoke 803. As in the embodiment shown in FIG. 2, the sample rod 801 in the present embodiment is surrounded by a nonconductive support tube 805 around which the flux coil 807, non-conductive filler 809 and 811, magnetization coil 813, and compensating coils 815 and 817 are wound. In the present embodiment the compensation coils are made small to be as close as possible to the air gaps. Naturally the compensation coils of the previous embodiment could also be made small for this reason.

As in the previous embodiment an access space 819 is provided to permit ease in inserting different sample rods into the device. Nonconductive clamps (not shown) are provided to maintain the spacial relationship of the access space, and screws (as shown in FIG. 2) are provided to secure the sample rod 801 in the yoke 803.

A pair of magnetometers 821, 823 are provided, each consisting of a core 825, 827 respectively, a drive winding 829, 831 respectively (each winding consisting of two coils, one around each leg of the respective core); and a sense winding 833, 835 respectively. Each magnetometer is constructed as shown in FIG. 4 and the details of the structure and operation previously described are applicable here.

Unlike the arrangement of the magnetometers shown in FIGS. 1, 2, and 3, which magnetometers measure the magnetic potential between two sample rods, in the present embodiment the magnetometers are situated along side a portion of the sample rod 801 where they can measure the outside magnetic potential difference or field strength for that portion of the sample rod and attempt to reduce it to zero. For symmetry two magnetometers are cylindrically arranged around the sample rod with their cores 825, 827 lying parallel thereto.

Normally, the leakage flux resulting from the magnetic potential difference would be fairly small due to the low permeability of air. To decrease this reluctance and to provoke or enhance the leakage flux, ferrite rings 837, 839 surround the entire sample rod and winding structures. Naturally some reluctance will remain since the thickness of the access space 819, the windings 807, 813 and the small space 841a and 814b between the winding 813 and the rings 837, 839 result in an air gap between the sample rod 801 and the ferrite rings 837, 839. As shown in FIG. 8b, which figure is a cross sectional view as seen along the line indicated by the arrows B in FIG. 8a, the circumference on opposite sides of the rings 837 and 839 is made flat to accommodate rectangular ferrite connecting blocks 843a, 843b, 845a, 845b which blocks join the cores 825, 827 to the rings 837, 839 as shown. Although shown as round, it will be understood that the rod sample 801 could have any cross sectional shape and that the ferrite rings would then have a shape approximating that of the sample. Although the ferrite rings are only shown in the embodiment of FIGS. 8a and 8b, it will be readily apparent to those skilled in the art, that such rings can also be used with the embodiment shown in FIGS. 1 and 2.

Figure 8A:
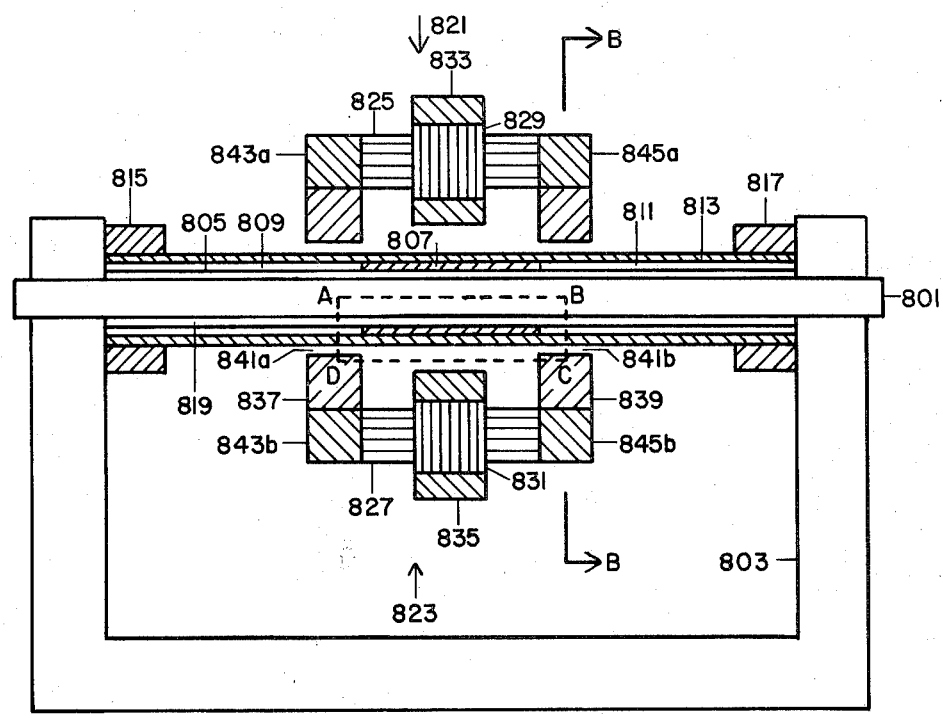
FIGS. 8(a) and 8(b) represent an alternate embodiment of the present invention, FIG. 8 (a) being a cross sectional view taken along line A—A of FIG. 8B, FIG. 8B being a cross sectional view taken along line B—B of FIG. 8A.
Figure 8B:
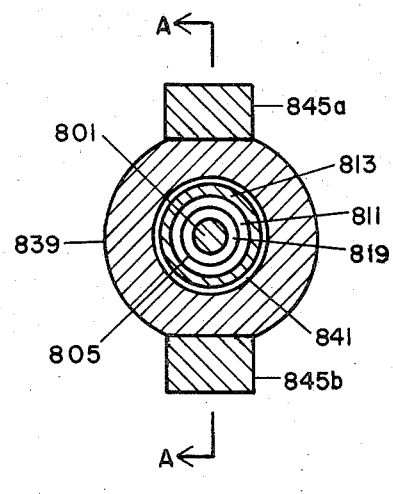

Also shown in FIG. 8a is the integration path A-B-C-D-A to be described below.

Figure 9:
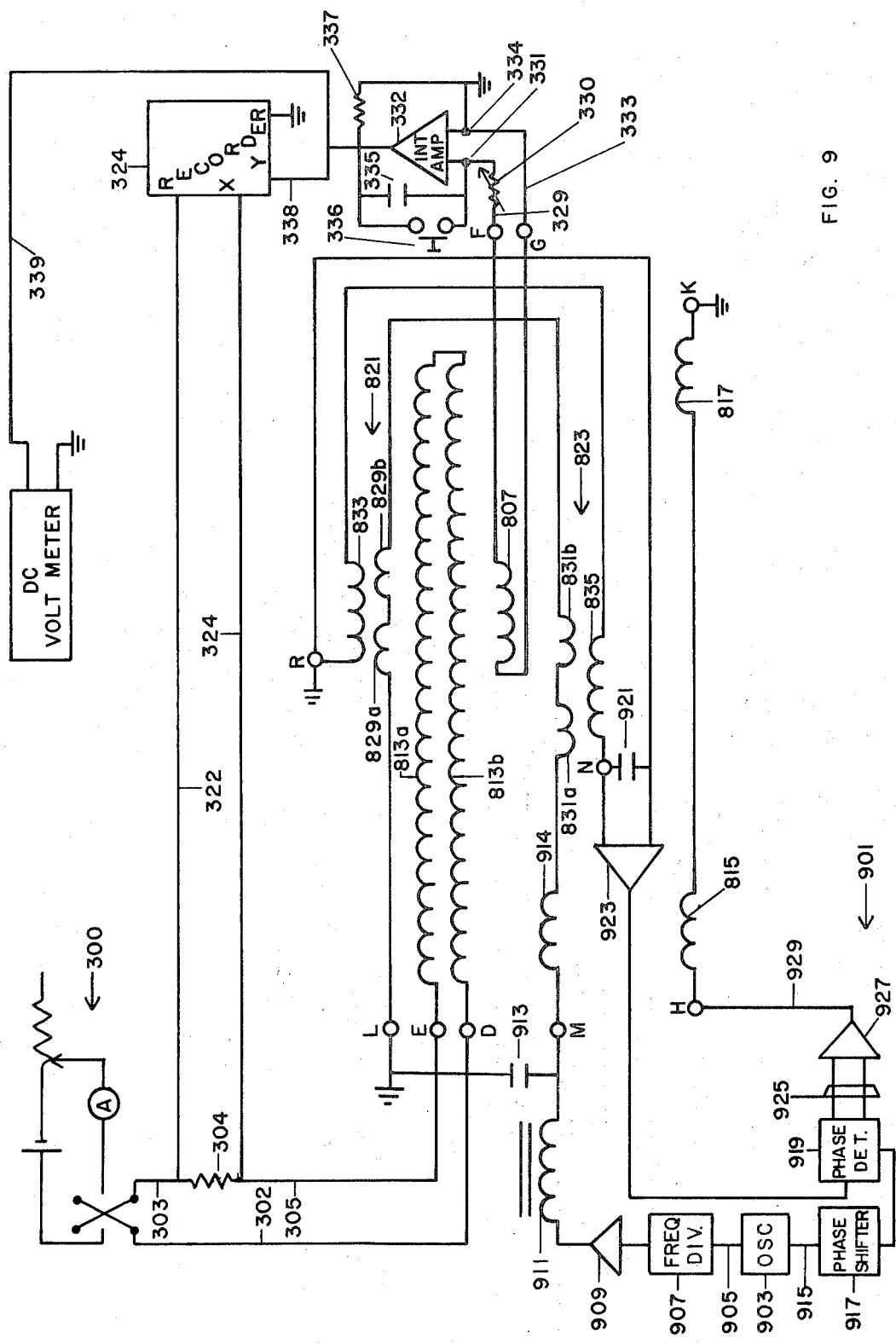
FIG. 9 is a wiring diagram of the permeameter shown in FIG. 8(a) and 8(b), the magnetizing control circuit for operating the permeameter, the automatic compensation control circuit, and the output and recording components.

FIG. 9 shows the preferred method for connecting the various coils and associated equipment of the present embodiment. Similarities to the embodiment illustrated in FIG. 3 will be apparent, but differences should also be noted. Of primary difference is the elimination of one complete set of magnetization, flux, and compensation coils, and the reorientation of the magnetometers. Of similarity is the use for current reduction of two separate magnetization windings 813a and 813b connected in series across terminals D and E. Also of similarity is the magnetizing control circuit 300 connected by lead 302 to terminal D and one side of the H coils 813a, b, and by lead 303, shunt 304, and lead 305 to terminal E and the other side of the H coils 813a, b. All components in the three hundred series have been previously described and such description is applicable here.

Unlike the previous embodiment, the flux coil 807 of the present embodiment consists of a single winding across terminals F and G; however, the various components connected across terminals F and G used to integrate the output from the flux coils to provide a measure of the flux, along with the DC voltmeter and X-Y recorder (all indicated as being in the three hundred series) are the same as in the previous embodiment, and reference is made to the above description of these components.

Of significant difference from the previous embodiment is the automatic control circuit 901 and the hook up of the magnetometers 821, 823 and compensation coils 815, 817. As before, all four drive windings 829a, 829b, 831a, and 831b are connected in series across terminals L and M.

In the present embodiment, as opposed to the previous embodiment, the output of the oscillator 903 on lead 905 is halved by frequency divider 907 and then amplified by amplifier 909. The output of amplifier 909 passes through inductor 911 to terminal M and the drive windings of the magnetometers. Terminal L is connected to ground and shunt capacitor 913 is placed across terminals L and M in parallel with the drive windings. With the proper choice of inductor 911, capacitor 913, and drive voltage, a so-called ferro-resonant operation is obtained resulting in more effective saturation of the cores twice during each cycle. The ultimate result is an increase in the sensitivity of the magnetometers.

During experiments it has been observed, as can be predicted, that if the drive pulses resulting from the ferroresonant operation are too short, less than optimum sensitivity, i.e., the sense voltage for a given D.C. flux, may result. Therefore, it may be advantageous to add a small value of inductance 914 in series between the capacitor and the magnetometer drive windings, especially if the leakage reactance of the magnetometer drive windings and the connecting leads is low.

The output of oscillator 903 on lead 915 passes to phase shift circuit 917 which shifts the phase of the reference signal to that emanating from the sense winding. From the phase shift circuit 917 the signal passes to phase detector 919.

Since it appears that the losses in the joints between the sample rod and the yoke are of the same magnitude, a single compensation system controlling both compensation coils is more practical than the dual compensation system previously described. This is the reason for arranging the magnetometers cylindrically around the sample rod, and for having a single phase detector 919.

The sense windings 833 and 835 of both magnetometers 821, 823 are connected in series across terminals R and N. A shunt capacitor 921 is also connected across terminal R and N in parallel with the sense windings. As before, the shunt capacitor is selected to give maximum voltage output, the capacitor and the sense windings forming a tuned circuit which is resonant at twice the frequency exciting the drive windings. Terminal R is connected to ground. Connected to terminal N and in parallel with shunt capacitor 921, amplifier 923 amplifies the voltage output of the sense windings for conduction to phase detector 919.

As before, the reference voltage from phase shift circuit 917 and the flux gate sense voltage from amplifier 923 enter the phase detector 919. The output signal of the phase detector 919 on leads 925, which signal is indicative of the magnetic potential difference or field strength at the location of the magnetometer, is amplified by DC amplifier 927. The amplified output on lead 929 is fed to terminal H and the compensating coils 815 and 817, which compensating coils are connected in series between terminals H and K, terminal K being connected to ground. With this arrangement, as the magnetizing current in the H coils is continuously varied, the feedback loop involving the magnetometers and compensating coils will continuously adjust the compensating current to the proper value as was done in the previous example.

Designating $H_l$ to represent the magnetic potential difference and $dl$ to represent an element of path length, the line integral $\int H_l\, dl$ for a closed path equals the enclosed ampere-turns, i.e., $$\int H_l\, dl = NI.$$

The above formula applied to the integration path A-B-C-D-A in FIG. 8a results in:

$$\int_A^B H_l dl + \int_B^C H_l dl + \int_C^D H_l dl + \int_D^A H_l dl = NI$$

where NI represents the number of ampere-turns provided by the magnetization coil between A and B. Due to the control of the outside field exercised by the magnetometers through the associased circuitry including the compensation coils the magnetic potential difference between C aand D is brought to zero or nezr zero.

$$\therefore \int_C^D H_l dl = 0$$

With regard to the line integrals $$\int_B^C H_l dl$$

and $$\int_D^A H_l dl$$

they either are zero or if there is a superimposed field they cancel each other, the assumption being that the superimposed field has the same direction and magnitude at both locations. Accordingly the above expression reduces to:

$$\int_A^B H_l dl = NI$$

or $$H \cdot l_m = NI,$$

where $l_m$ equals the distance between A and B on the integration path, and $$H = (N/l_m)\, I = nI$$

where $n$ equals the number of turns per unit length.

The scope of the invention is of course not limited to the specific embodiment described above. For instance, instead of flux gate sensors any other flux sensing arrangement could be used which will give an instantaneous output signal which by amplitude and sign is proportional to the leakage flux. Accordingly, instead of flux gate units or magnetometers, so-called Hall generators could be used. The Hall generator is a thin wafer of semiconductor material with four electrodes in a square arrangement. Feeding an ac current between two opposite electrodes, a voltage should be developed between the remaining two electrodes proportional to the input current and the magnetic field perpendicular to the wafer. One can therefore feed the Hall generator with an ac signal and obtain an output ac signal which by amplitude and phase corresponds to the leakage flux density perpendicular to the wafer, (if the wafer is inserted between the specimens in proper position and with the plane of the wafer parallel to the direction of the specimens). The output signal from the Hall generator can easily be amplified and fed to a phase detector where the ac signal is converted to a dc signal proportional to the leakage flux density. In this case there is no frequency doubling as described for the flux gate and therefore the same ac signal applied to the Hall generator can be used as a reference phase for the phase detector.

Likewise the geometrical configuration described is not critical. Obviously instead of round rods, specimens with square or rectangular cross section can be used with proper modification in the end blocks and with properly shaped coils.

Numerous other variations, rearrangements, modifications and changes may be devised by those skilled in the art without departing from the scope and spirit of the invention as defined by the appended claims.

What is claimed is:

1. In a permeameter for measuring the relationship of flux density to magnetic field strength of sample material secured in end block means, said permeameter containing magnetizing coil means for magnetizing said sample material, flux sense coil means for detecting the magnetic flux induced in said sample material, and compensating coil means for reducing the effect of flux losses; the improvement comprising automatic leakage flux detector means located adjacent said sample material to detect flux losses of the material at such location including means for providing signals representative of the losses detected, and means responsive to said signals to enable said compensating coil means to automatically reduce the effect of such flux losses at said location.

2. A permeameter as described in claim 1 which includes magnetizing control circuit means for selectively providing magnetizing currents to said magnetizing coil means.

3. A permeameter as described in claim 2 in which said magnetizing control circuit means includes means for selectively varying the value of the current supplied to said magnetizing coil means, and means for selectively varying the polarity of said current.

4. The improvement set forth in claim 2 which includes an integrating circuit for integrating the output of said flux sense coil means, output indicator means connected to said integrating circuit means including means for producing at least a part of a hysteresis plot which is representative of the relationship of flux density to magnetic field strength of the sample material secured in said end block means; and means in said magnetizing control circuit means for adjusting the magnetizing current to said magnetizing coil means in a manner to effect the provision of a hysteresis plot.

5. The improvement set forth in claim 4 wherein said output indicator means include an X-Y recorder having X and Y input circuits, and wherein said magnetizing control circuit provides representative signals to said X input, and the output of said integrating circuit is connected to the Y input circuit of said output indicator means.

6. The improvement as set forth in claim 4, wherein said output indicator means includes a digital voltmeter, and in which the signal output of said integrator circuit means is connected to said digital voltmeter for visual display purposes.

7. In a permeameter for measuring the relativity of flux density to magnetic field strength of a sample material, the improvement comprising an automatic leakage flux detector means located to provide signals which represent the flux losses at one location on said sample at least, compensating coil means located adjacent said sample means for reducing the effect of said flux losses, and automatic compensating control circuit means responsive to the signal output of said automatic leakage flux detector means to provide compensating signals to said compensating coil means so as to automatically reduce the effect of said flux losses.

8. In a permeameter for measuring the relationship of flux density to magnetic field strength of at least a first and second material sample having the ends thereof secured in first and second end block means, said permeameter including at least one magnetizing coil means for each of said material samples, at least one flux sense coil means for each of said material samples, and at least one compensation coil means for each of said end block means; a first and a second magnetometer means positioned between said first and second material samples to detect magnetic potential differences between the two samples, each of said magnetometer means including core means having drive winding means and sense winding means wound thereon, automatic compensation control circuit means connected to the output of said sense winding means of said first and second magnetometer means including signal generating means for providing drive signals to said drive winding means for said first and second magnetometer means, further means controlled by said signal generating means for providing reference signals, and first and second comparator means for comparing said reference signals with the signal output of said sense winding means for said first and second magnetometer to provide first and second dc output signals which vary in proportion to said detected magnetic potential differences between the two samples, and first output means for applying said first dc output signal to said compensation coil means for one of said end block means and second output means for applying said second dc output signal to said compensation coil means for the other of said end block means.

9. A permeameter means as claimed in claim 8 wherein said signal generating means comprises an oscillator circuit for providing ac drive current for saturating said core means of said first and second magnetometer means during a portion of each half cycle, and in which the leakage flux created by the external magnetic field produced by said magnetizing coil means is modulated to induce an ac voltage in said sense winding means of said first and second magnetometer means.

10. A permeameter as set forth in claim 9 which includes capacitor means for tuning said sense windings to provide a signal output having a frequency twice that of said oscillator circuit, and in which said further means comprises a frequency doubler circuit for doubling the frequency of the signals output from said oscillator circuit.

11. A permeameter as set forth in claim 8 in which said flux sense coil means are segmented to provide end and center coils respectively, and which includes switch means for at times connecting said end coils in opposition with said center coils, and at other times connecting said end coils in series aiding relation with said center coils.

12. A permeameter as set forth in claim 8 in which said compensation coil means include first and second compensating coils located adjacent the one end of said first and second material samples respectively and connected in series to said first output means, and a third and fourth compensation coil means located adjacent the other ends of said first and second material samples respectively and connected in series to said second output means.

13. A permeameter as claimed in claim 8 wherein said signal generating means comprises an oscillator for producing a drive signal for activating said drive winding means, and said further means comprises a frequency doubler enabled by said oscillator for producing said reference signals, and in which said first and second comparator means comprise first and second phase detector means for comparing said first and said second reference signals with the signals output from said sense winding means of said first and second magnetometer means to produce said first and second dc output signals.

14. A permeameter as claimed in claim 13 in which said means for applying said dc output signal to said compensation coil means for said first and second end block means comprises first and second dc amplifier means for amplifying the dc output signals of said first and second phase detector means, and means for coupling the amplified signals respectively to the compensation coil means for said first and second end block means.

15. In a permeameter for measuring the relationship of flux density to magnetic field strength of at least one material sample secured in at least one end block means, said permeameter including at least one magnetizing coil means for said material sample, at least one flux sense coil means for said material sample, and at least one compensation coil means for said end block means; magnetometer means positioned adjacent to said sample material and said compensation coil means to detect magnetic potential differences, said magnetometer means including at least one core means having drive winding means and sense winding means wound thereon, automatic compensation control circuit means connected to the output of said sense winding means, signal generating means in said automatic compensation control circuit means for providing drive signals to said drive winding means, further means controlled by said signal generating means for providing a reference signal, and comparator means for comparing said reference signal with the signal output of said sense winding means to provide a dc output signal which varies in proportion to said detected magnetic potential differences, and means for applying said dc output signal to said compensation coil means to automatically reduce said magnetic potential differences.

16. A permeameter means as claimed in claim 15 wherein said end block means supports a plurality of material samples, and which includes discrete magnetizing coil means and flux sense means for each sample material secured in said end block means, and which includes a discrete compensation coil means adjacent each location wherein said sample material is secured in said end block means.

17. A permeameter means as claimed in claim 15 wherein said drive winding means in said magnetometer include at least one drive winding coil wound on said core means, and wherein said sense winding means in said magnetometer include at least one sense winding coil wound on said core means.

18. In a permeameter for measuring the magnetic properties of a sample secured in a holding means, magnetizing coil means for magnetizing said sample, flux sense coil means for detecting the magnetic flux which is induced in a segment of the sample, flux detector means located adjacent said sample segment including at least one magnetometer unit, flux path means for establishing a path for leakage flux from a first and second position along the axis of said sample member to said magnetometer unit, compensating coils for said sample, and compensating circuit means connected to the output of said magnetometer means for providing compensating currents to said compensating coils of a value to reduce the difference in magnetic potential across said sample segment in the direction of zero value.

19. A permeameter as set forth in claim 18 in which said magnetometer includes a core member, and said sample comprises an elongated rod, and said flux path means comprise first and second flux path members located at first and second positions which are spaced along the longitudinal axis of said elongated rod, and which are connected to opposite ends of said magnetometer core member.

20. A permeameter as set forth in claim 19 in which said first and second flux path members include circular ferrite discs having centrally located apertures for providing passage for said sample therethrough, and which further include ferrite members which connect a portion of each of said circular discs to said magnetometer core member.

21. In a permeameter as set forth in claim 19 in which said holding means includes a cylindrical tube for receiving said elongated rod, and in which said flux sense coil means is wound about a segment of said cylindrical tube which is located between said first and second positions on said sample, and in which said magnetizing coil means is wrapped around said tube for at least the length of said predetermined segment.

22. A system as set forth in claim 19 which includes a second magnetometer unit, and in which said first flux path means is connected to a first end of the core members of each of said magnetometer devices, and said second flux path means is connected to the opposite ends of the core members of said first and second magnetometers.

23. A permeameter as set forth in claim 18 in which said flux sense coil means includes an integrating circuit for integrating the output of said flux sense coil means, output indicator means connected to said integrating circuit means including means for producing at least a part of a hysteresis plot which is representative of the relationship of flux density to magnetic field strength of the sample material, magnetizing control circuit means for selectively providing magnetizing currents to said magnetizing coil means, including means for adjusting the magnetizing current to said magnetizing coil means in a manner to effect the provision of a hysteresis plot.

24. A permeameter as set forth in claim 18 in which said compensating coil means include first and second compensating coils located adjacent the opposite ends of said sample respectively, and connected in series to the output of said compensating circuit means, and in which said first and second positions are substantially equidistant from the respective ends of said sample.

25. A permeameter as set forth in claim 18 in which said magnetometer unit includes core means having drive winding means and sense winding means wound thereon, and in which said compensating circuit means includes means connected to the output of said sense winding means of said magnetometer unit, and which includes signal generating means for providing drive signals to said drive winding means for said magnetometer unit, further means controlled by said signal generating means for providing reference signals, comparator means for comparing said reference signals with the signal output of said sense winding means for said magnetometer unit to provide DC output signals which vary in proportion to the detected difference in magnetic potential between said first and second position, and output means for applying said output signal to said compensation coil means.

26. A permeameter as set forth in claim 25 wherein said signal generating means comprises an oscillator circuit for providing AC drive currents for saturating said core means of said magnetometer unit during a portion of each half cycle, and in which the leakage flux created by the external magnetic field produced by the magnetizing coil means is modulated to induce an AC voltage in said sense winding means of said magnetometer unit.

27. A system as set forth in claim 18 wherein $H_l$, $l_m$ = $NI$ in which $H_l$ is the magnetic potential difference between said first and second positions, $l_m$ is the distance between said first and second positions, and $NI$ represents the ampere turn provided by said magnetizing coil between said first and second positions.

* * * * *